US008489911B1

(12) United States Patent
Hill et al.

(10) Patent No.: US 8,489,911 B1
(45) Date of Patent: Jul. 16, 2013

(54) HARDWARE WCK2CK TRAINING ENGINE USING META-EDC SWEEPING AND ADJUSTABLY ACCURATE VOTING ALGORITHM FOR CLOCK PHASE DETECTION

(75) Inventors: Eric Lyell Hill, Palo Alto, CA (US); Russell R. Newcomb, Morgan Hill, CA (US); Shu-Yi Yu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 540 days.

(21) Appl. No.: 12/650,281

(22) Filed: Dec. 30, 2009

Related U.S. Application Data (60) Provisional application No. 61/244,852, filed on Sep. 22, 2009.

(51) Int. Cl.
*G06F 1/12* (2006.01)
*G06F 1/10* (2006.01)

(52) U.S. Cl.
CPC ..................................... *G06F 1/10* (2013.01)
USPC ...................................................... 713/503

(58) Field of Classification Search
USPC ...................................................... 713/500
See application file for complete search history.

(56) References Cited

U.S. PATENT DOCUMENTS

| 7,802,166 | B2 * | 9/2010 | Nygren et al. ................ 714/758 |
| 7,836,386 | B2 * | 11/2010 | Schumacher et al. ........ 714/798 |
| 7,889,594 | B2 * | 2/2011 | Yoon et al. ................. 365/233.1 |
| 7,889,595 | B2 * | 2/2011 | Park ............................ 365/233.1 |
| 7,902,887 | B2 * | 3/2011 | Bae et al. ...................... 327/156 |
| 7,908,232 | B2 * | 3/2011 | Gregorius ........................ 706/16 |
| 8,031,539 | B2 * | 10/2011 | Gregorius ................ 365/189.15 |
| 8,050,136 | B2 * | 11/2011 | Park .......................... 365/233.11 |
| 8,130,890 | B2 * | 3/2012 | Kim et al. ....................... 375/360 |
| 8,207,976 | B2 * | 6/2012 | Hein ............................. 345/519 |
| 8,242,819 | B2 * | 8/2012 | Bae et al. ....................... 327/156 |
| 8,300,482 | B2 * | 10/2012 | Bae ................................. 365/191 |
| 8,306,169 | B2 * | 11/2012 | Kim et al. ....................... 375/354 |
| 2007/0283297 | A1 * | 12/2007 | Hein et al. ........................ 716/1 |
| 2008/0065967 | A1 * | 3/2008 | Talbot ............................ 714/781 |
| 2009/0251181 | A1 * | 10/2009 | Bae et al. ....................... 327/156 |
| 2009/0322770 | A1 * | 12/2009 | Bae .................................. 345/522 |
| 2010/0054059 | A1 * | 3/2010 | Yoon et al. ...................... 365/194 |
| 2010/0054073 | A1 * | 3/2010 | Park ............................ 365/233.1 |
| 2011/0158030 | A1 * | 6/2011 | Bae et al. .................... 365/233.1 |

OTHER PUBLICATIONS

Hynix, "1Gb (32Mx32) GDDR5 SSGRAM, H5GQ1H24AFR," Nov. 2009.
JEDEC, "GDDR5 WCK2CK Training," Committee Item No. 1733.15, Dec. 2007.
JEDEC Standard, GDDR5 SGRAM, JESD212, Dec. 2009, JEDEC Solid State Technology Association.

* cited by examiner

*Primary Examiner* — Ryan Stiglic
(74) *Attorney, Agent, or Firm* — Patterson & Sheridan, L.L.P.

(57) ABSTRACT

One embodiment of the present invention sets forth a technique for performing high-performance clock training. One clock training sweep operation is performed to determine phase relationships for two write clocks with respect to a command clock. The phase relationships are generated to satisfy timing requirements for two different client devices, such as GDDR5 DRAM components. A second clock training sweep operation is performed to better align local clocks operating on the client devices. A voting tally is maintained during the second clock training sweep to record phase agreement at each step in the clock training sweep. The voting tally then determines whether one of the local clocks should be inverted to better align the two local clocks.

21 Claims, 8 Drawing Sheets

HARDWARE WCK2CK TRAINING ENGINE USING META-EDC SWEEPING AND ADJUSTABLY ACCURATE VOTING ALGORITHM FOR CLOCK PHASE DETECTION

CROSS REFERENCE TO RELATED APPLICATIONS

This application claims the priority benefit of the U.S. provisional patent application having Ser. No. 61/244,852 and filed on Sep. 22, 2009.

BACKGROUND OF THE INVENTION

1. Field of the Invention

The present invention generally relates to clock phase estimation and more specifically to a graphics dual data rate (GDDR) interface with a hardware write clock to clock (WCK2CK) training engine using meta-error detection code (EDC) sweeping and adjustably accurate voting algorithm for clock phase detection.

2. Description of the Related Art

Computational systems typically include one or more processing units, and one or more discrete memory devices coupled to the one or more processing units via a memory interface bus. Each of the one or more processing units may be a conventional central processing unit (CPU), or another type of processing unit, such as a graphics processing unit (GPU). Each discrete memory device is commonly a dynamic random access memory (DRAM) component that is configured to operate according to technical requirements of the memory interface bus. The technical requirements for a given memory interface bus are conventionally established as an industry-wide standard. Each of the one or more processing units reads data from and writes data to the DRAM component via the memory interface bus. As processing speed requirements increase for various types of processing units, operating speeds for associated memory interface buses also increase. Current operating speeds pose significant challenges for system designers because manufacturing variation in associated circuitry commonly result in signal-to-signal skews that are significant compared to data bit durations on current memory interface buses. To compensate for signal-to-signal skew, current memory interface buses typically execute one or more training procedures, where signal skews are measured and compensated, thereby phase-aligning the signals for near optimal operation.

In addition to increasing speed requirements, power management is also an increasingly important requirement. To minimize system power, the memory interface bus should be able to operate slowly when processing requirements decrease, and faster when processing requirements increase. Each time the memory interface bus changes speed, certain training operations need to be repeated. In a graphics application, where real-time performance is required, any re-training must not impact whether the memory interface bus can meet all real-time data access requirements, such as screen refresh. Failure to meet all real-time requirements may cause flicker and significantly degrading video quality and user experience.

One standard memory interface bus that includes clock training for signal phase-alignment and variable interface clock speed for power management features is referred to in the art as graphics dual data rate version five (GDDR5). GDDR5 is defined by the well-known industry standards group JEDEC. DRAM components that adhere to GDDR5 are commonly incorporated into modern graphics systems requiring high performance as well as power management. GDDR5 defines a thirty-two-bit wide memory interface bus, and includes one error detection code (EDC) bit per byte. In a clock training mode, the EDC bits are used as feedback from the DRAM component to a DRAM controller that is coupled to an associated processing unit that needs to access the DRAM component. The DRAM controller "sweeps" a write clock (used for transmitting data) versus a reference clock (used for transmitting commands and addresses) to find an optimal phase relationship between the two. The EDC feedback indicates whether the DRAM component is receiving the write clock early or late with respect to the reference clock for the current phase step in the sweep. The DRAM controller then establishes write clock timing for the DRAM component at the transition between early and late.

An additional feature of GDDR5 is the ability to split the thirty-two-bit data bus into two sixteen-bit data busses, each attached to one of two discrete DRAM components, for operation in "x16 mode." In x16 mode, total storage attached to the thirty-two-bit bus may be advantageously doubled with minimal loss of performance. However, each of the two different DRAM components attached to the memory interface bus may require a different phase relationship between their respective write clock and the reference clock. With only one set of clock pins defined in the GDDR5 specification, a two sweep training procedure is conventionally performed to find a phase relationship between the write clock and the reference clock that is acceptable to both DRAM components. The first sweep finds a first phase relationship for one of the DRAM components, and a second sweep finds a second phase relationship for the second DRAM component. A midpoint (average) between the two phase relationships is then used by both DRAM components as an acceptable compromise. While this two sweep technique allows two GDDR5 devices to operate in x16 mode, training time may become a significant burden in certain applications. Lengthy training times associated with GDDR5 x16 mode may impede the real time performance requirements of a graphics system. For example, screen flickers occur if GDDR5 training times prevent refreshing the screen contents as scheduled.

Accordingly, what is needed in the art is a technique that enables faster clock training in GDDR5 DRAM components than is currently specified in the art.

SUMMARY OF THE INVENTION

One embodiment of the present invention sets forth a method for determining a timing midpoint (average) between timing values associated with at least two different memory components. The method includes programming a clock generator with a first clock phase; receiving, from each of the at least two memory components, in response to a command clock signal transmitted by the clock generator and a first write clock signal also transmitted by the clock generator and having the first clock phase, a phase advertisement indicating whether the first write clock signal is early, late, or transient relative to the command clock signal; generating a meta-error detection code (meta-EDC) value based on the phase advertisements received from the at least two memory components; and determining the timing midpoint associated with the first write clock signal based on the meta-EDC value.

One advantage of the disclosed method is that it enables clock training to be performed more quickly relative to prior art approaches, and the disclosed method is simply to implement than prior art techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
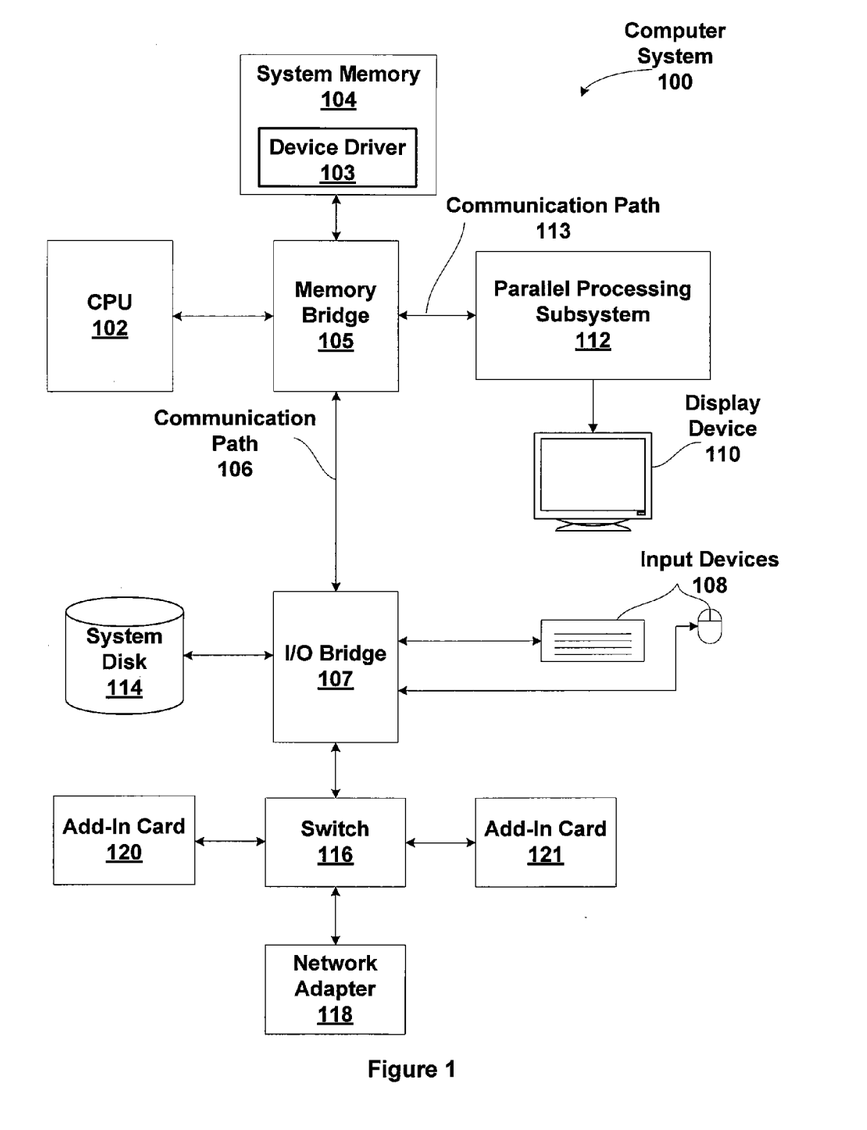
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
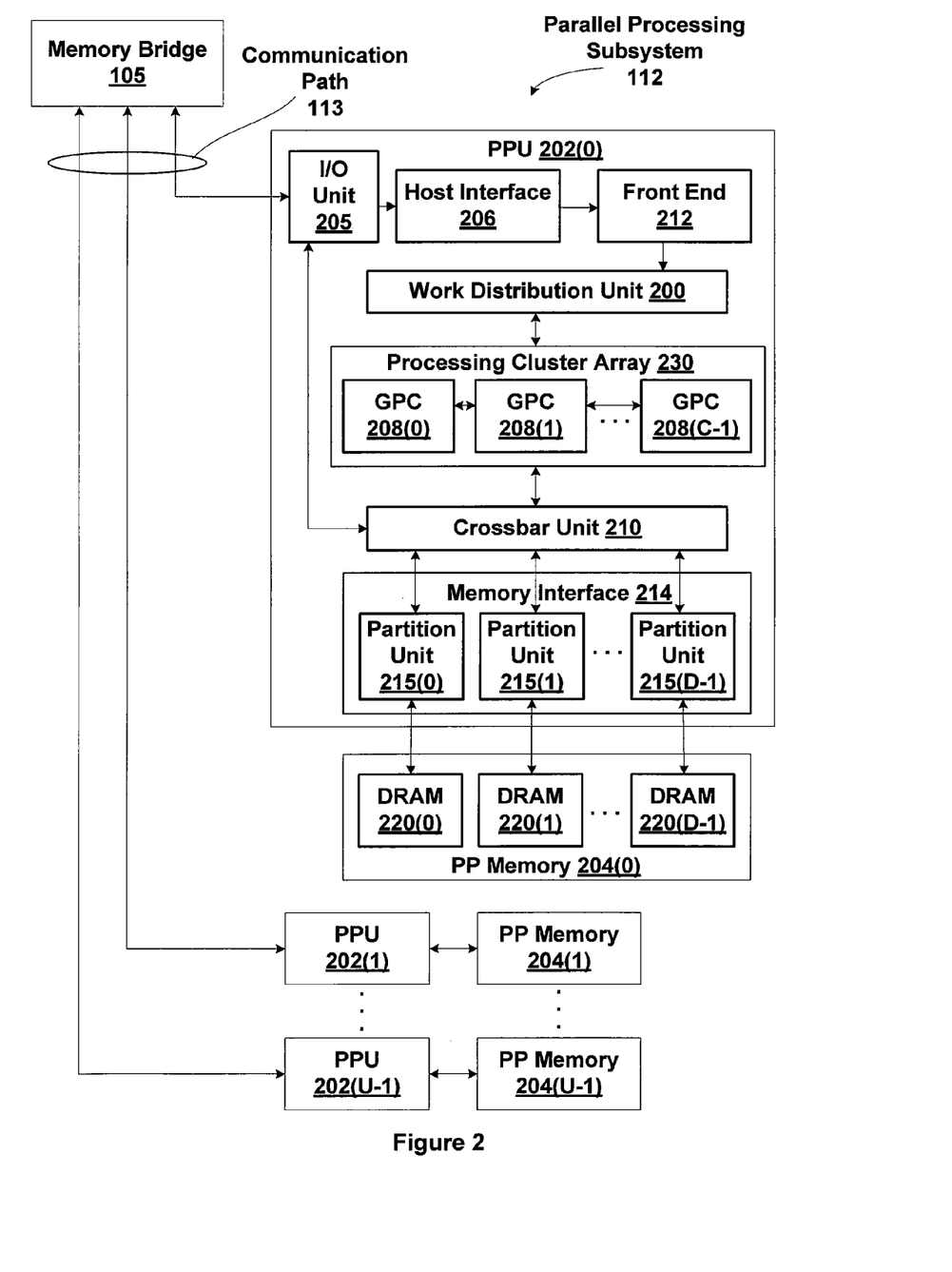
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
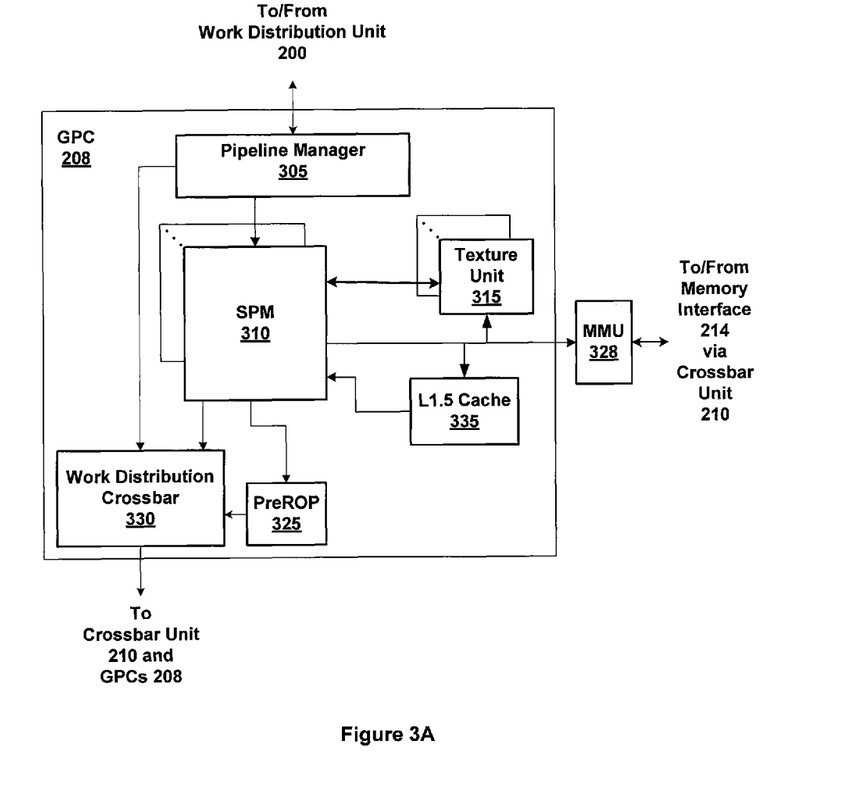
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $N \geq 1$, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CIA address space is used to pass data between threads within a CTA. Data stored in the per-thread local address space and per-CIA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
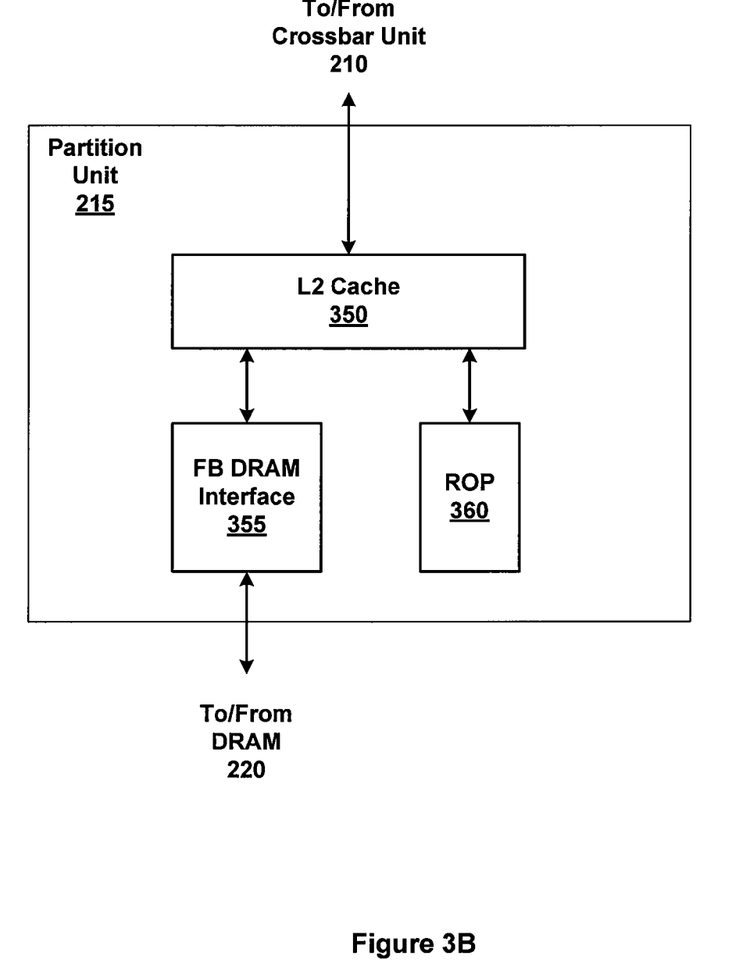
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
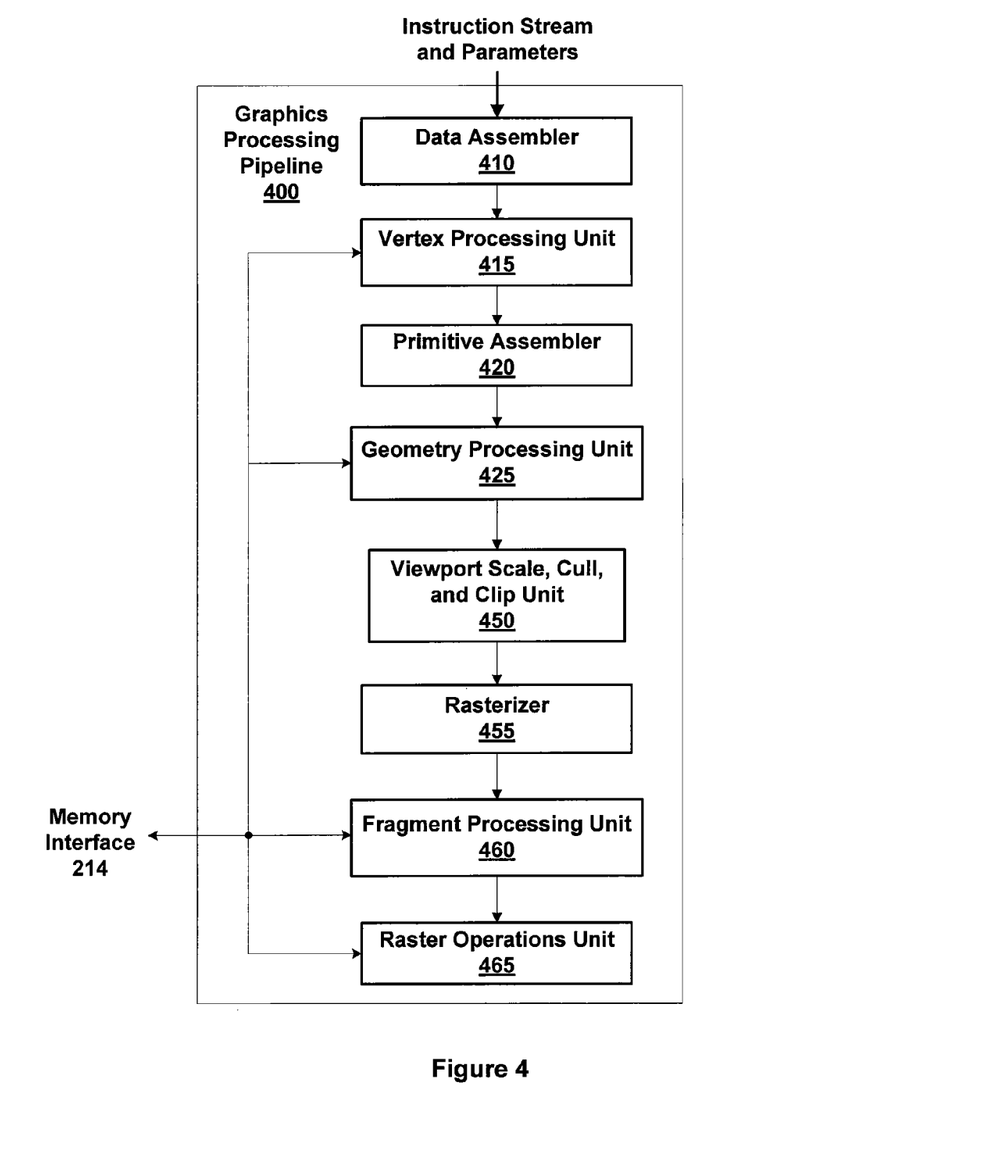
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Hardware Clock Training and Phase Detection

Figure 5:
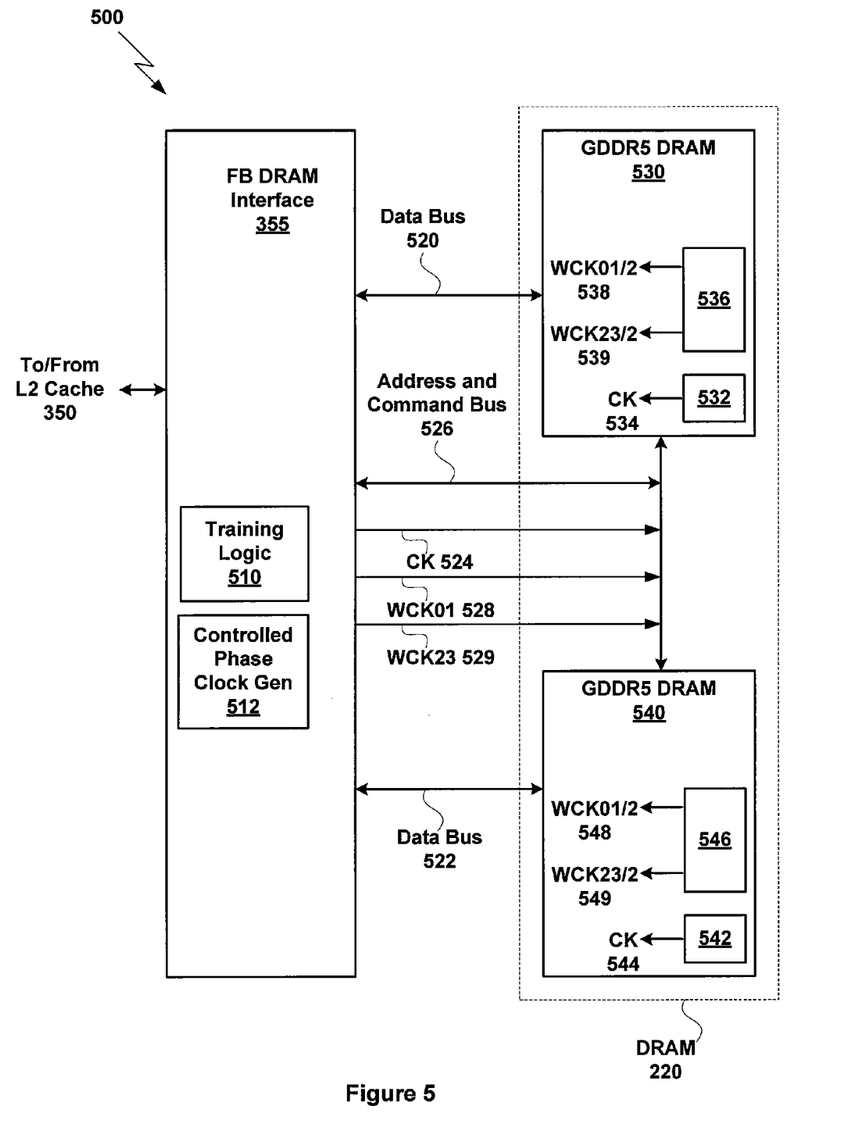
FIG. 5 illustrates a memory subsystem in a GDDR5 x16 configuration that implements one or more aspects of the present invention.

FIG. 5 illustrates a memory subsystem 500 in a GDDR5 x16 configuration that implements one or more aspects of the present invention. The memory subsystem 500 includes the FB DRAM interface 355 of FIG. 3B, and DRAM 220 of FIG. 2. The DRAM 220 includes GDDR5 DRAM components 530 and 540. A GDDR5 DRAM interface includes, without limitation, data bus 520, data bus 522, an address and command bus 526, a command clock (CK) 524, a write clock for bytes zero and one (WCK01 528), and a write clock for bytes two and three (WCK23 529). The data bus 520 includes signals for simultaneously transmitting two bytes between FB DRAM interface 355 and GDDR5 DRAM 530. Data byte zero, EDC0, data byte two and EDC2 are conventionally transmitted over data bus 520 to GDDR5 DRAM 530. The data bus 522 includes signals for simultaneously transmitting two bytes between FB DRAM interface 355 and GDDR5 DRAM 540. Data byte one, EDC1, data byte three and EDC3 are conventionally transmitted over data bus 522 to GDDR5 DRAM 540. The address and command bus 526 includes common signals transmitted to both GDDR5 DRAM 530 and GDDR5 DRAM 540. The address and command bus 526 transmits commands and related addresses between the FB DRAM interface 355 and the GDDR5 DRAM 530 and 540.

Data transmissions over the address and command bus 526 are referenced to CK 524. Data transmissions over data bus 520 are referenced to both WCK01 528 and WCK23 529, with byte zero of the four-byte transaction referenced to WCK01 528, and byte two referenced to WCK23 529. Similarly, data transmissions over data bus 522 are referenced to both WCK01 528 and WCK23 529, with byte one of the four-byte transaction referenced to WCK01 528 and byte three referenced to WCK23 529.

Each GDDR5 DRAM component 530, 540 typically includes command clock circuitry for distributing CK 524 internally. This command clock circuitry is shown as CK buffer 532, which generates internal clock signal CK 534 from CK 524, and CK buffer 542, which generates internal clock signal CK 544 from CK 524. Each GDDR5 DRAM component 530, 540 also includes circuitry for dividing the frequency of each write clock signal WCK01 528, WCK23 529 by two for generating corresponding internal write clocks operating at half frequency. This circuitry in GDDR DRAM component 530 is shown as WCK generator 536, which generates WCK01/2 538 from WCK01 528 and WCK23/2 539 from WCK23 529. In GDDR5 DRAM component 540, this circuitry is shown as WCK generator 546, which generates WCK01/2 548 from WCK01 528 and WCK23/2 549 from WCK23 529.

Proper operation of GDDR5 DRAM component 530 requires the phase relationship between CK 534 and WCK01/2 538 and between CK 534 and WCK23/2 539 to be within a certain timing window, given by an associated component design specification. In other words, WCK01/2 538 may be early or late by a specified timing margin with respect to CK 534, and the GDDR5 DRAM component 530 should operate properly. Similarly, WCK23/2 539 may be early or late by a specified timing margin with respect to CK 534, and the GDDR5 DRAM component 530 may operate properly. However, if the phase relationship between CK 534 and WCK01/2 538 or the phase relationship between CK 534 and WCK23/2 539 is outside the specified timing margin, then the GDDR5 DRAM component 530 may not operate properly when data is read from or written to the DRAM 220. Similarly, proper operation of GDDR5 DRAM component 540 requires a phase relationship between CK 544 and WCK01/2 548, as well as between CK 544 and WCK23/2 549 to be within a respective timing window. The phase relationships between CK 534 and internal write clocks are governed by the phase relationships between CK 524 and the external write clocks (WCK01 528 and WCK23 529), which may be adjusted individually by the training logic 510. Controlled phase clock generator 512 generates WCK01 528 and WCK23 529, each with a phase determined by training logic 510. The controlled phase clock generator 512 may be implemented using any technically feasible technique.

Delay paths between each clock provided by the FB DRAM interface 355 (CK 524, WCK01 528, WCK23 529) and each internal clock within GDDR5 DRAM components 530, 540 may vary independently. Delay variation may be due to any number of factors, including signal trace variation from printed circuit board (PCB) fabrication variation, inherent speed differences due to semiconductor fabrication variation, and variation due to prevailing operating conditions such as die temperature. To compensate for overall delay variation, a set of training procedures is used find a set of timing delay values that satisfy timing requirements for both the GDDR5 DRAM component 530 and the GDDR5 DRAM component 540. The training procedures are executed by training logic 510, within the FB DRAM interface 355.

The training logic 510 is configured to perform at least two different training procedures. The first training procedure is for aligning WCK01/2 538 and WCK23/2 539 to CK 534 and WCK01/2 548 and WCK23/2 549 to CK 544. The second training procedure is for aligning overall phase for clock generators 536 and 546.

With one GDDR5 DRAM component coupled to FB DRAM interface 355, nearly optimal timing between CK and WCK01 and between CK and WCK23 may be achieved. However, with two GDDR5 DRAM components 530 and 540 coupled to the FB DRAM interface 355, in "x16" ("clamshell") mode, clock signals are shared and a compromise between optimal timing for each of the two GDDR5 DRAM components 530 and 540 may be needed for proper operation. The first training procedure, described in greater detail below in FIG. 6, determines a timing midpoint between optimal timing values for GDDR5 DRAM components 530 and 540 using a novel technique that is more efficient than prior art techniques. The procedure involves performing one training sweep that determines timing for CK 524 to WCK01 528 and CK 524 to WCK23 529 that satisfies timing requirements for CK 534 to WCK01/2 538, CK 534 to WCK23/2 539, CK 544 to WCK01/2 548, and CK 544 to WCK23/2 549. By contrast, prior art techniques require two or more sweeps to determine the timing midpoint.

A given timing midpoint (between timing for CK 524 to WCK01 528 and CK 544 to WCK01/2 548, and between timing for CK 524 to WCK23 529 and CK 544 to WCK23/2 549) may be individually sub-optimal for each of the GDDR5 DRAM components 530 and 540, but is still within a specified timing window for both GDDR5 DRAM components 530 and 540 to operate properly.

The second training procedure, described in greater detail below in FIG. 7, determines whether each of the local clocks 534, 544, should be inverted (shifted 180 degrees) for proper alignment. This second training procedure is desirable because each of the clock generators 536 and 546 operate independently. Even when locked to WCK01 528 divided by two in frequency and phase, the clock generators 536 and 546 may be out of phase with respect to each other by 180 degrees. The outputs of clock generators 536 and 546 may be individually inverted to compensate for 180-degree phase offsets.

Persons skilled in the art will recognize that the well-known GDDR5 specification describes one approach to performing both clock alignment procedures. However, this prior art approach is relatively inefficient compared to the technique described herein. Importantly, embodiments of the present invention may be implemented without modification to GDDR5 DRAM components 530 and 540, which are presently low-cost commodity devices. Additionally, embodiments of the present invention may operate independently of a particular data path implementation, allowing designers to use existing or standardized data path circuitry with embodiments of the invention.

The first training procedure involves a sweeping operation in which WCK01 528 and WCK23 529 are together subjected to a varying phase relationship with respect to CK 524. The phase relationship is varied according to a specified step size. During this training procedure, the GDDR5 DRAM component 530 is programmed to advertise whether WCK01/2 538, WCK23/2 539 are each early or late with respect to CK 534. Similarly, GDDR5 DRAM component 540 is programmed to advertise whether WCK01/2 548, WCK23/2 549 are each early or late with respect to CK 544. Driving early/late status on the EDC signals is specified in the GDDR5 standard specification. Training logic 510 may sample one phase relationship multiple times and interpret the collection of samples as an "Early," "Late," or "Transient" clock relationship. An "Early" advertisement occurs when a DRAM component 530 or 540 "drives early" (EDC signal=1) more than a threshold number of times. A "Late" advertisement occurs when a DRAM component "drives late" (EDC signal=0) more than a threshold number of times. A "Transient" advertisement occurs when neither Early nor Late thresholds are met.

The phase relationship between CK 524 and WCK01 528 and WCK23 529 is incremented during the sweep operation to allow the training logic 510 to build a profile of early/late/transient samples at each phase step for each of the two GDDR5 DRAM components 530, 540. The profile includes a step number and whether a particular EDC pin reported an early, late, or transient relationship between CK 524 and each WCK (WCK01 528 and WCK23 529), for each GDDR5 DRAM component 530, 540.

Table 1 is an example of a profile from a sweep operation specified from a phase of 0 through a phase of 65, with a step size of 5. For GDDR5 DRAM 530 an "E" entry indicates WCK01/2 538 is early for the given phase step. Similarly, "L" indicates WCK01/2 538 is late for the given phase step. Additionally, "T" indicates WCK01/2 538 is transient and neither early nor late for the given phase step. For GDDR5 DRAM 540 an "E" entry indicates WCK01/2 548 is early for the given phase step. Similarly, "L" indicates WCK01/2 548 is late for the given phase step. Additionally, "T" indicates WCK01/2 548 is transient and neither early not late for the given phase step. An "X" indicates an optimal phase alignment for an associated GDDR5 DRAM component 530, 540. The training logic 510 calculates the position of X based on the profile of early/late/transient samples. Two such tables would be used to describe timing relationships for GDDR5 DRAM component 530 and 540. Table 1 describes timing for CK 524 to WCK01 528. A second, similar table can be used to describe timing for CK 524 to WCK23 529. As shown, a phase value of 25 is centered within the transient ("T") recordings for GDDR5 DRAM component 530. The same sweep reveals a phase value of 45 is centered within the transient recordings of GDDR5 DRAM component 540.

Embodiments of the present invention introduce a concept of "meta-EDC," which represents the average of EDC advertisements from GDDR5 DRAM components 530 and 540. If both DRAM components advertise early for a given WCK then the meta-EDC is early. If both DRAMs advertise late for a given WCK then the meta-EDC is late. The meta-EDC is transient if it is neither early nor late. As shown, meta-EDC transient recordings span a phase value of 15 through a phase value of 55. A phase value of 35 represents the midpoint phase value that is centered between a value of 15 and 55. The midpoint phase value represents an optimal meta-EDC phase and is marked with X.

Converting two EDC results into one representative meta-EDC result has several advantages. Using meta-EDC result information, the training logic 510 only needs to perform one sweep instead of the JEDEC recommended two independent sweeps. With meta-EDC the training logic 510 only needs to calculate one meta-EDC midpoint per WCK. The GDDR5 JEDEC specification recommends calculating three midpoints per WCK: one for DRAM component 530, another for DRAM component 540, the third is the average of DRAM components 530, 540 midpoints. Using meta-EDC reduces training time as well as design complexity and area for the training logic 510.

TABLE 1

| WCK/2 Phase | 0 | 5 | 10 | 15 | 20 | 25 | 30 | 35 | 40 | 45 | 50 | 55 | 60 | 65 |
|---|---|---|---|---|---|---|---|---|---|---|---|---|---|---|
| DRAM 530 EDC0 | E | E | E | T | T | T | T | T | L | L | L | L | L | L |
| DRAM 530 Optimal Setting | | | | | | | X | | | | | | | |
| DRAM 540 EDC0 | E | E | E | E | E | E | E | T | T | T | T | T | L | L |
| DRAM 540 Optimal Setting | | | | | | | | X | | | | | | |
| meta-EDC | E | E | E | L | L | T | T | T | T | T | T | T | L | L |
| meta-EDC Optimal Setting | | | | | | | X | | | | | | | |

In one embodiment, training logic 510 includes storage registers containing the begin and end positions for a window of transient meta-EDC shaded in gray and marked with "T" in Table 1. A phase midpoint is determined by circuitry within training logic 510 that is configured to find a midpoint value between the stored begin and end positions. The midpoint value from Table 1 (and a second comparable table) represents a primary result from the first training procedure. The midpoint values may be used by the FB DRAM interface 355 to determine an offset between CK 534 and WCK01 528 (and between CK 534 and WCK23 529) for normal operation.

The second training procedure comprises a voting algorithm and is used to detect relative phase alignment between WCK generators 536 and 546. The accuracy needed for x16 mode depends on WCK (both WCK01 528 and WCK23 529) frequency and a particular vendor's "tWCK2CKPIN parameter." In some situations very little accuracy is needed (e.g. when ½ tWCK is much greater than tWCK2CKPIN, where tWCK is the duration of a clock cycle in time). However, more accuracy is needed as tWCK2CKPIN approaches ½ tWCK. Using a coarse, fixed step size for performing a phase sweep may result in not having enough accuracy for certain configurations of clock speed and GDDR DRAM component selection. Alternatively, using a fine, fixed step size for performing the phase sweep may result in excess accuracy for certain configurations of clock speed and GDDR DRAM component selection. Persons skilled in the art will recognize that any solution involving a fixed step size inevitably limits either flexibility or performance. For this reason, an adjustable step size for phase detection sweeping is desirable. The adjustably accurate voting algorithm enables the FB DRAM interface 355 to use a nearly maximum step size and therefore fewer steps to generally maximize performance for a given GDDR5 DRAM vendor and clock frequency combination.

The second training procedure involves a second sweeping operation in which WCK01 528 and WCK23 529 are together subjected to a varying phase relationship with respect to CK 524. The phase relationship is varied according to the programmable step size. In certain applications, a finer step size is used, while in other applications, a coarser step size may be used. During this training procedure, the GDDR5 DRAM components 530 and 540 are programmed to advertise whether WCK is early or late with respect to CK 524. As in the case of the first training procedure, advertising early/late/transient status is accomplished by driving error detection code (EDC) pins when a programmable threshold of early or late clock arrivals is recorded by a corresponding GDDR5 DRAM component 530, 540. A vote is taken at each step in the sweep, and a result of the vote is recorded within training logic 510. Results of the overall voting process are used to determine whether to invert a clock in GDDR5 DRAM components 530, 540.

The voting process is illustrated in Tables 2 and 3, below. Step size for WCK is programmable and separate from the step size used previously in the first training procedure. This algorithm sweeps across half of the WCK/2 clock period. There is no need to sweep the 2nd half of the WCK/2 clock period since it will produce the same results as the first half.

A vote is taken at each WCK step of the sweep shown in Table 2. If GDDR5 DRAM components 530 and 540 both advertise EDC early ("E") or both advertise EDC late ("L") then the DRAMs have the same clock polarity. A voting tally for a given WCK step increments by one if DRAMs agree on clock polarity for the WCK step. Alternatively, the voting tally decrements by one for each step that GDDR5 DRAM components 530 and 540 advertise opposite EDC values. Lastly, the voting tally holds its value if either GDDR5 DRAM components 530 and 540 advertise transient EDC ("T").

A transient EDC is one that wavers between early and late. Thresholds may define how many samples of EDC=1 must occur in a WCK step for a GDDR5 DRAM component to advertise EDC early. Thresholds may also define how many samples of EDC=0 must occur for a DRAM to advertise EDC late. In the context of embodiments of the present invention, a GDDR5 DRAM component is considered to have advertised an EDC transient if neither EDC early nor EDC late thresholds occur.

In one embodiment, the voting tally is evaluated at the end of the sweep. A positive voting tally means the clocks are more in phase than out of phase and WCK/2 clocks do not need to be inverted. A negative voting tally means the clocks are more out of phase than in-phase and one of the GDDR5 DRAM component 530, 540 clocks needs to be inverted to bring the two clocks closer together in phase. A zero voting tally means inverting or not inverting one of the WCK generators 536, 546 will have no measurable benefit. In one embodiment, a zero voting tally does not invert one of the WCK clock generators 536, 546.

TABLE 2

| WCK01/2 Phase | 0 | 15 | 30 | 45 | 60 | 75 | 90 | 105 | 120 | 135 | 150 | 165 |
|---|---|---|---|---|---|---|---|---|---|---|---|---|
| DRAM 530 EDC0 | E | E | T | T | T | L | L | L | L | L | L | L |
| DRAM 540 EDC0 | E | E | E | E | E | E | E | T | T | L | L | L |
| Vote Result | + | + | 0 | 0 | 0 | − | − | 0 | 0 | + | + | + |
| Voting Tally | +1 | +2 | +2 | +2 | +2 | +1 | 0 | 0 | 0 | +1 | +2 | +3 |

Table 2 indicates a positive voting tally (positive three) after the sweep has completed, indicating WCK generators 536, 546 are generally in phase with respect to each other, so inverting one is not necessary. A similar outcome is illustrated in Table 3, below. In Table 2, a step size of 15 is used, while a step size of 30 is used in Table 3. Both arrive at a functionally identical conclusion, which is to not invert a clock in one of the GDDR5 DRAM components 530, 540, however, Table 3 requires about half as much time to complete because the step size is doubled. A general performance gain is enabled by using programmable step sizes.

TABLE 3

| WCK01/2 Phase | 0 | 30 | 60 | 90 | 120 | 150 |
|---|---|---|---|---|---|---|
| DRAM1 EDC0 | E | T | T | L | L | L |
| DRAM2 EDC0 | E | E | E | E | T | L |
| Vote Result | + | 0 | 0 | — | 0 | + |
| Voting Tally | +1 | +1 | +1 | 0 | 0 | +1 |

Figure 6:
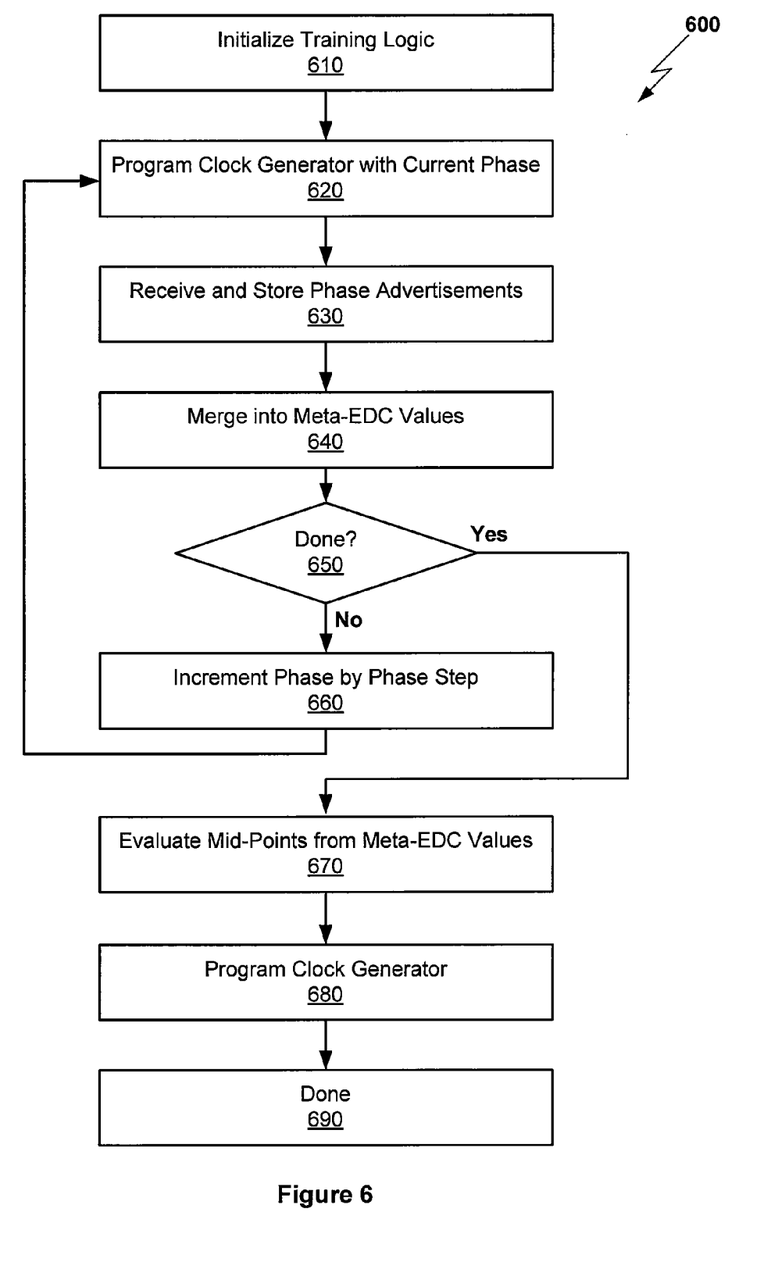
FIG. 6 is a flow diagram of method steps for determining clock timing shared by two DRAM components within the memory subsystem, according to one embodiment of the invention.

FIG. 6 is a flow diagram of method steps 600 for determining clock timing shared by two DRAM components within the memory subsystem, according to one embodiment of the invention. Although the method steps are described in conjunction with the systems of FIGS. 1-5, persons skilled in the art will understand that any system configured to perform the method steps, in any order, is within the scope of the invention.

The method begins in step 610, where training logic 510 is initialized. This includes, without limitation, setting a current phase to zero, and setting an array of meta-EDC status bits to an initial state. The array of meta-EDC status bits should include storage meta-EDC status bits sufficient to represent a maximum programmable number of steps for two sweep samples sets. One sweep sample set is associated with samples merged from GDDR5 DRAM components 530 and 540 for WCK01 528 timing information and represented as a meta-EDC status value. As described previously in the Table 1 discussion, a meta-EDC value may be "E" (early), "L" (late), or "T" (transient). Persons skilled in the art will recognize that these values may be easily represented using two or more bits per value. The second sweep sample set is associated with samples merged from GDDR5 DRAM components 530 and 540 for WCK23 529 timing information and represented as a meta-EDC status value. Each of the sweep sample sets is ultimately used to compute a corresponding timing value for normal operation of the memory subsystem 500.

In step 620, training logic 510 programs controlled phase clock generator 512 to generate clock signals WCK01 528 and WCK23 519, according to a current phase value. In step 630 the training logic 510 receives and stores phase advertisements in the form of EDC bits from GDDR5 DRAM components 530 and 540. The received phase advertisements comprise sampled bit values transmitted from DRAM components 530 and 540 via EDC bits (pins) to training logic 510. As described previously, an "Early" advertisement is considered received when a threshold number of "Early" values are sampled. Similarly, a "Late" advertisement is considered received when a threshold number of "Late" values are sampled. When neither a threshold number of "Late" nor "Early" samples are sampled for a given specified number of samples, then a "Transient" advertisement is considered to be received by the training logic 510.

The training logic 510 may store the phase advertisements in any technically feasible format. One efficient format includes storing timing endpoints for "Transient" phase advertisements. For example, in Table 1, steps 15 and 35 may be stored as timing endpoints for GDDR DRAM 530, and steps 35 and 55 may be stored as timing endpoints for GDDR DRAM 540.

In step 640, training logic 510 merges the phase advertisement samples from GDDR5 DRAM components 530 and 540 corresponding to WCK01 528 to generate a meta-EDC status corresponding to the current phase value and WCK01 528. The training logic 510 also merges the phase advertisement samples from GDDR5 DRAM components 530 and 540. In one embodiment, the phase advertisement samples are organized according to phase step, as shown in Table 1. As described previously, one such table is maintained per clock source (WCK01, WCK23).

If, in step 650, if all phase steps have been completed by training logic 510, then the sweeping operation on external clocks WCK01 528 and WCK23 529 is done and the method proceeds to step 670. In step 670, training logic 510 evaluates midpoint values for clocks WCK01 528 and WCK23 529 using the meta-EDC values stored previously.

In step 680, training logic 510 programs the controlled phase clock generator 512 to generate clock signals WCK01 528 and WCK23 529, according to the midpoint values evaluated previously. The method terminates in step 690.

Returning to step 650, if all phase steps have not be completed by training logic 510, then the sweeping operation on external clocks WCK01 528 and WCK23 529 is not done and the method proceeds to step 660, where training logic 510 increments the current phase value by one programmed phase step value. The method then proceeds back to step 620.

Figure 7:
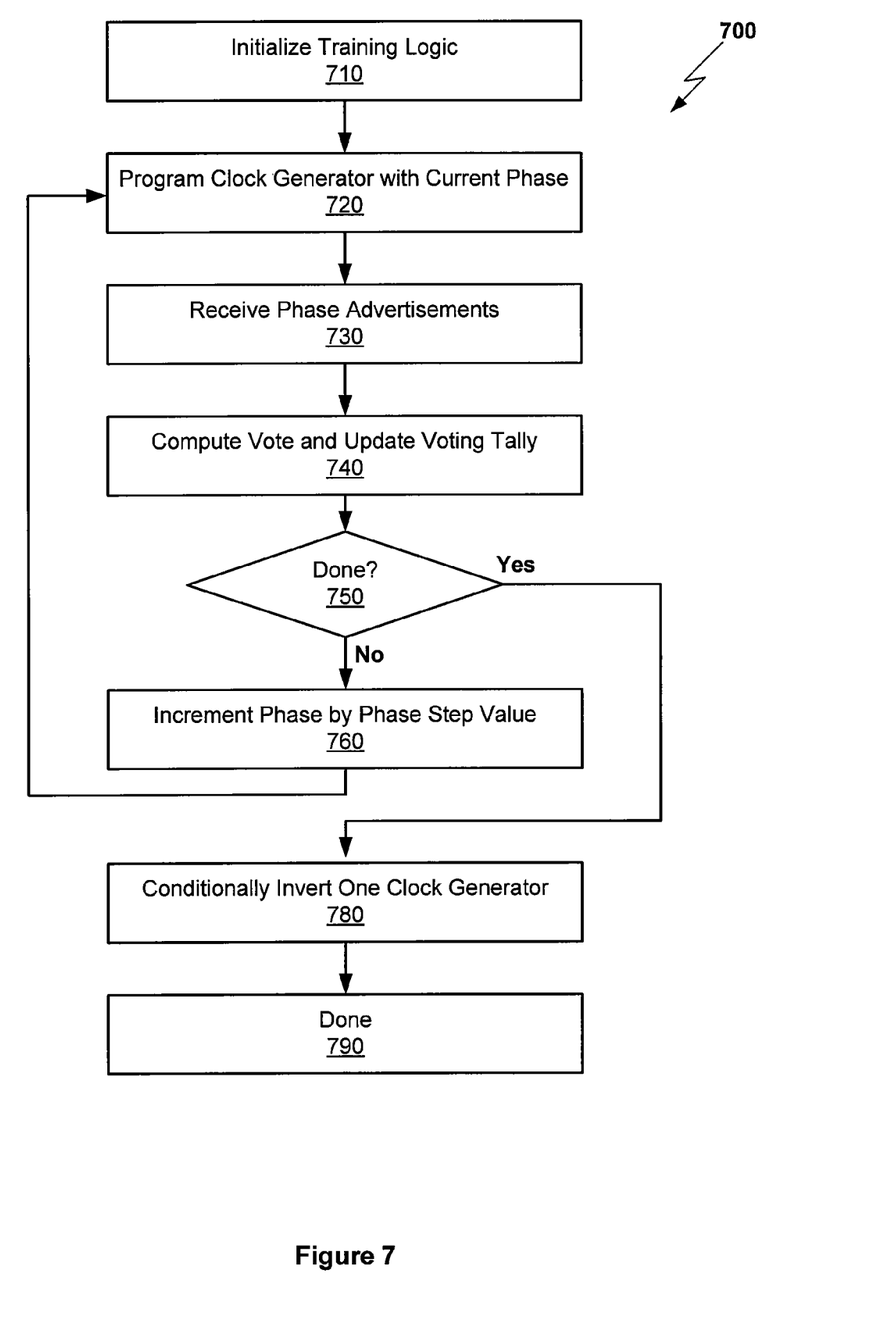
FIG. 7 is a flow diagram of method steps for determining whether an internal DRAM clock should be inverted within a memory subsystem, according to one embodiment of the invention.

FIG. 7 is a flow diagram of method steps 700 for determining whether an internal DRAM clock should be inverted within a memory subsystem, according to one embodiment of the invention. Although the method steps are described in conjunction with the systems of FIGS. 1-5, persons skilled in the art will understand that any system configured to perform the method steps, in any order, is within the scope of the invention.

The method begins in step 710, where training logic 510 is initialized. This includes, without limitation, setting a current phase to zero, and setting a voting tally to zero.

In step 720, training logic 510 programs controlled phase clock generator 512 to generate clock signals WCK01 528 and WCK23 519, according to a current phase value. In step 730 the training logic 510 receives phase advertisements in the form of EDC bits from GDDR5 DRAM components 530 and 540. As discussed previously, a given phase advertisement value may be "early," "late," or "transient."

In step 740, training logic 510 computes a vote, as discussed previously in Tables 2 and 3, based on received phase advertisements for the current phase value. Specifically, if GDDR5 DRAM components 530 and 540 both advertise their respective phase values as early or late, then the voting tally is incremented by one. If GDDR5 DRAM components 530 and 540 advertise one early and one late phase value, then the voting tally is decremented by one. If either GDDR5 DRAM components 530 and 540 advertise a transient value, then the voting tally is left unchanged for the current phase value.

If, in step 750, if all phase steps have been completed by training logic 510, then the sweeping operation is done and the method proceeds to step 780. In step 780, training logic 510 conditionally inverts one of the WCK generators 536, 546, as discussed previously in Tables 2 and 3. For example if the voting tally is a negative number, then the training logic 510 programs WCK 536 to operate with an inverted output. Persons skilled in the art will recognize that either of the two WCK generators 536, 546 may be inverted to bring both WCK generators 536, 546 closer together in phase if they are otherwise operating substantially out of phase. The method terminates in step 790.

Returning to step 750, if all phase steps have not be completed by training logic 510, then the sweeping operation is not done and the method proceeds to step 760, where training logic 510 increments the current phase value by one programmed phase step value. The method then proceeds back to step 720.

In sum, a clock training technique is disclosed for two memory compontents conforming to the GDDR5 DRAM specification and configured in "x16" ("clamshell") mode. The clock training technique includes two training procedures. The first training procedure finds timing values for two clocks that simultaneously satisfy timing requirements for both GDDR DRAM components. The first training procedure involves sweeping a phase relationship between two clocks, while recording early, late, and transient advertisements from the two GDDR5 DRAM components. A midpoint timing value is then selected from the sweep data that is operable for both GDDR5 DRAM components. The second training procedure determines whether one local clock within one GDDR5 DRAM component needs to be inverted for better phase alignment with another local clock in the other GDDR5 DRAM component. The second training procedure involves sweeping a phase relationship between two clocks, while maintaining a voting tally based on early, late, and transient advertisements from the two GDDR5 DRAM components. A negative voting tally indicates the two local clocks are operating at substantially different phases and one of the two local clocks should be inverted to bring both local clocks into better phase alignment. A positive or zero voting tally requires no further action.

One advantage of the present invention is that clock training may be performed more quickly than by prior art techniques. Furthermore, persons skilled in the art will recognize that the methods of FIGS. 6 and 7 are actually simpler to implement than those described in the prior art.

Persons skilled in the art will recognize that alternate embodiments of the present invention may be applied to interface technologies other than GDDR5 without departing the scope of the present invention. Persons skilled in the art will also recognize that the techniques taught herein for clock training may be implemented as customized fixed-function hardware or as a software program executing on an appropriately configured hardware system.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for determining a timing midpoint between timing values associated with at least two different memory components, the method comprising:
   programming a clock generator with a first clock phase;
   receiving, from each of the at least two memory components, in response to a command clock signal transmitted by the clock generator and a first write clock signal also transmitted by the clock generator and having the first clock phase, a phase advertisement indicating whether the first write clock signal is early, late, or transient relative to the command clock signal;
   generating a meta-error detection code (meta-EDC) value based on the phase advertisements received from the at least two memory components during a single sweep of the first clock phase across a clock phase range; and
   determining the timing midpoint associated with the first write clock signal based on the meta-EDC value.

2. The method of claim 1, wherein, with respect to the first write clock signal, the first clock phase is incremented across a clock phase range, and, for each increment of the first clock phase, the steps of receiving and generating are performed, and the step of determining is based on all of the generated meta-EDC values.

3. The method of claim 2, with respect to the first write clock signal, further comprising the step of storing at least one aspect of each of the phase advertisements received from the at least two memory components.

4. The method of claim 2, further comprising the steps of:
   receiving, from each of the at least two memory components, in response to a command clock signal transmitted by the clock generator and a second write clock signal also transmitted by the clock generator and having the first clock phase, a phase advertisement indicating whether the second write clock signal is early, late, or transient relative to the command clock signal;
   generating a meta-error detection code (meta-EDC) value based on the phase advertisements received from the at least two memory components; and
   determining the timing midpoint associated with the second write clock signal based on the meta-EDC value.

5. The method of claim 4, wherein, with respect to the second write clock signal, the first clock phase is incremented across the clock phase range, and, for each increment of the first clock phase, the steps of receiving and generating are performed, and the step of determining is based on all of the generated meta-EDC values.

6. The method of claim 5, with respect to the second write clock signal, further comprising the step of storing the phase advertisements received from the at least two memory components.

7. The method of claim 1, wherein the phase advertisement received from a first of the at least two memory components is generated by sampling an error detection code pin from the first memory component with a threshold level of early or late arrivals, and the phase advertisement received from a second of the at least two memory component is generated by sampling an error detection code pin from the second memory component with a threshold level of early or late arrivals.

8. The method of claim 1, wherein the at least two memory components comprise graphics double data rate (GDDR) dynamic random access memories (DRAMs).

9. The method of claim 1, wherein the clock generator resides in frame buffer logic, and the at least two memory components reside in off-chip memory.

10. A memory subsystem, comprising:
 frame buffer logic that includes training logic configured to:
 program a clock generator with a first clock phase;
 receive, from each of the at least two memory components, in response to a command clock signal transmitted by the clock generator and a first write clock signal also transmitted by the clock generator and having the first clock phase, a phase advertisement indicating whether the first write clock signal is early, late, or transient relative to the command clock signal;
 generate a meta-error detection code (meta-EDC) value based on the phase advertisements received from the at least two memory components during a single sweep of the first clock phase across a clock phase range; and
 determine the timing midpoint associated with the first write clock signal based on the meta-EDC value.

11. The memory subsystem of claim 10, wherein, with respect to the first write clock signal, the first clock phase is incremented across a clock phase range, and, for each increment of the first clock phase, the of receiving and generating are performed, and the step of determining is based on all of the generated meta-EDC values.

12. The memory subsystem of claim 11, with respect to the first write clock signal, further comprising the step of storing at least one aspect of each of the phase advertisements received from the at least two memory components.

13. The memory subsystem of claim 11, wherein the training logic is further configured to:
 receive, from each of the at least two memory components, in response to a command clock signal transmitted by the clock generator and a second write clock signal also transmitted by the clock generator and having the first clock phase, a phase advertisement indicating whether the second write clock signal is early, late, or transient relative to the command clock signal;
 generate a meta-error detection code (meta-EDC) value based on the phase advertisements received from the at least two memory components; and
 determine the timing midpoint associated with the second write clock signal based on the meta-EDC value.

14. The memory subsystem of claim 13, wherein, with respect to the second write clock signal, the first clock phase is incremented across the clock phase range, and, for each increment of the first clock phase, the training logic is configured to receive and generate, and the training logic is configured to determine based on all of the generated meta-EDC values.

15. The memory subsystem of claim 14, with respect to the second write clock signal, the training logic is configured to store the phase advertisements received from the at least two memory components.

16. The memory subsystem of claim 10, wherein the phase advertisement received from a first of the at least two memory components is generated by sampling an error detection code pin from the first memory component with a threshold level of early or late arrivals, and the phase advertisement received from a second of the at least two memory component is generated by sampling an error detection code pin from the second memory component with a threshold level of early or late arrivals.

17. The memory subsystem of claim 10, wherein the at least two memory components comprise graphics double data rate (GDDR) dynamic random access memories (DRAMs).

18. The memory subsystem of claim 10, wherein the clock generator resides in the frame buffer logic, and the at least two memory components reside in off-chip memory.

19. A computer device, comprising:
 a processing unit; and
 a memory subsystem coupled to the processing unit and having frame buffer logic that includes training logic configured to:
 program a clock generator with a first clock phase,
 receive, from each of the at least two memory components, in response to a command clock signal transmitted by the clock generator and a first write clock signal also transmitted by the clock generator and having the first clock phase, a phase advertisement indicating whether the first write clock signal is early, late, or transient relative to the command clock signal,
 generate a meta-error detection code (meta-EDC) value based on the phase advertisements received from the at least two memory components during a single sweep of the first clock phase across a clock phase range, and
 determine the timing midpoint associated with the first write clock signal based on the meta-EDC value.

20. The computing device of claim 19, wherein the clock generator resides in the frame buffer logic, and the at least two memory components reside in off-chip memory.

21. The method of claim 1, wherein, with respect to the phase advertisement, an early advertisement is received when a write clock of a dynamic random access memory (DRAM) component is early with respect to a command clock signal more than a threshold number of times, a late advertisement is received when a write clock of a dynamic random access memory (DRAM) component is late with respect to a command clock signal more than a threshold number of times, and a transient advertisement occurs when neither early nor late thresholds are met.

* * * * *